(12) United States Patent
Petzold

(10) Patent No.: US 6,612,196 B1
(45) Date of Patent: Sep. 2, 2003

(54) GEAR SHIFTING DEVICE

(75) Inventor: Rainer Petzold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/581,824

(22) PCT Filed: Dec. 15, 1998

(86) PCT No.: PCT/EP98/08202

§ 371 (c)(1),
(2), (4) Date: Jun. 16, 2000

(87) PCT Pub. No.: WO99/32810

PCT Pub. Date: Jul. 1, 1999

(30) Foreign Application Priority Data

Dec. 19, 1997 (DE) .......................... 197 56 639

(51) Int. Cl.$^7$ ............................... F16H 61/30
(52) U.S. Cl. ..................... 74/473.11; 74/335
(58) Field of Search ............... 74/473.11, 335, 74/359, 360, 361; 92/169.3, 165 PR, 85 R

(56) References Cited

U.S. PATENT DOCUMENTS

| | | | |
|---|---|---|---|
| 3,465,609 A | * | 9/1969 | Fisher et al. ............ 74/360 |
| 3,945,265 A | * | 3/1976 | Bell et al. ............... 74/335 |
| 4,579,015 A | * | 4/1986 | Fukui .................... 74/335 |
| 4,593,606 A | * | 6/1986 | Klatt et al. ............... 92/52 |
| 4,722,237 A | * | 2/1988 | McNinch, Jr. ............ 74/335 |
| 4,896,553 A | * | 1/1990 | Sato et al. ............... 74/335 |
| 4,998,443 A | * | 3/1991 | Janiszewski ............. 74/335 |
| 5,417,124 A | * | 5/1995 | Huff et al. ............... 74/335 |
| 5,566,070 A | | 10/1996 | Mack et al. |

FOREIGN PATENT DOCUMENTS

| | | |
|---|---|---|
| DE | 34 17 473 A1 | 11/1985 |
| DE | 43 09 027 A1 | 9/1994 |
| DE | 43 25 964 A1 | 1/1995 |
| DE | 39 38 402 C2 | 5/1995 |
| DE | 195 00 137 A1 | 7/1996 |
| DE | 196 37 001 A | 3/1997 |
| DE | 195 43 646 A1 | 5/1997 |
| DE | 196 10 665 A1 | 9/1997 |
| DE | 196 12 835 A1 | 10/1997 |
| DE | 196 20 037 A1 | 11/1997 |
| EP | 0 064 641 A1 | 11/1982 |
| EP | 0 085 498 A1 | 8/1983 |
| EP | 0 271 234 A2 | 6/1988 |
| EP | 0 368 230 A1 | 5/1990 |
| EP | 0 487 861 A1 | 6/1992 |
| EP | 0 541 035 A1 | 5/1993 |
| EP | 0 723 097 A2 | 7/1996 |
| EP | 0 731 298 A2 | 9/1996 |
| RU | 1333878 A1 | 8/1987 |

* cited by examiner

Primary Examiner—William C Joyce
(74) Attorney, Agent, or Firm—Davis & Bujold, P.L.L.C.

(57) ABSTRACT

A power-assisted gear shifting device (118) for a multi-speed step-change transmission (102) having a step-down design. The power-assisted gear shifting device (118) comprises a plurality of auxiliary units. Each one of the auxiliary units comprises a plurality of valves (4, 5, 6, 7), a shift cylinder (1), a piston (2) and a gear shifting element (2A). Each one of the shift cylinders (1) accommodates one piston (2) which is axially movable along a guiding rail (9) by hydraulic fluid controlled by the plurality of valves (4, 5, 6, 7). The piston (2) is connected to a gear shifting element (2A) which facilitates torque transmission.

17 Claims, 2 Drawing Sheets

GEAR SHIFTING DEVICE

FIELD OF THE INVENTION

The invention relates to a gear shifting device for a multi-speed step-change transmission.

BACKGROUND OF THE INVENTION

EP O 541 035 discloses a gear shifting device for multi-speed step-change transmissions having valves and shift cylinders in which pistons actuated by a control fluid are located. Shift rods are attached to the shift cylinders which via gear shifting elements act upon parts of the transmission to create a torque-transmitting connection. A shift rod actuates here parts that belong to an auxiliary unit.

The shift rods have great weight which unfavorably contributes to the total weight of the transmission and must be accelerated or decelerated by the gear shifting device upon each gear shifting operation.

The problem on which this invention is based is to disclose a gear shifting device which eliminates the disadvantages of existing gear shifting devices.

SUMMARY OF THE INVENTION

It is proposed to provide for each auxiliary unit of a step-change transmission one unit comprising the valves, shift cylinders, pistons and gear shifting elements. Contrary to gear shifting devices known already, this whole gear shifting device sits in the immediate proximity of the auxiliary unit. An auxiliary unit is preferably comprised of two gear wheels disposed side by side in the transmission and can be alternately engaged in the torque transmission. An auxiliary unit, however, can only consist of one engageable gear wheel in the torque transmission when, e.g. two gear wheels opposite each other need not be engaged when shifting to a reverse gear ratio.

By virtue of a compact unit arrangement, it is possible to eliminate connecting elements between the gear shifting elements, preferably formed by shift forks or shift levers, and the shift cylinders and pistons. As already mentioned, such connecting elements are essentially shift rods made of steel which, to a great extent, contribute to the total weight of the transmission. The reaction times between the command that triggers a gear shift and the movement of the gear shifting elements are abbreviated by the elimination of the bulky shift rods to be moved, it is an advantageous development thereby it is possible to use the pulsed 2/2 way valves as triggering valves. It is thus possible, when engaging the gear wheels in a torque-transmitting connection, to adapt shifting force and shifting time. The adaptation preferably consists in the valves being loaded at a higher frequency when engaging than when disengaging the connection. In another advantageous development the pulsed valves are operated with a voltage amounting to a multiple of the standard voltage of the valve. To adapt the pulsed valves, a displacement measuring device is advantageously used, which indicates the actual position of the piston in relation to the shift cylinder. The displacement measuring device is preferably placed within the shift cylinder, but it can also be provided in a position outside the shift cylinder, where it is connected with the movable part of the unit.

In another advantageous development, the piston of the gear shifting unit is situated upon a piston rod, upon which it is axially movable. On the piston rod, it is possible to provide, without hindering each other, the pistons of the gear shifting units of several auxiliary units. The units for each auxiliary unit are preferably disposed in a row.

In another advantageous development, several gear shifting units, of which each gear shifting unit belongs to a respective auxiliary unit, are comprised in one part. The part can be assembled separately from the transmission and then be adapted and attached to the transmission as a unit. This also makes it possible to separately produce and test a complete gear shifting device independent of the type of transmission concerned.

BRIEF DESCRIPTION OF THE DRAWINGS

In another advantageous development, the gear shifting units have stop which dampen the impact of the pistons on the edges of the shift cylinders. The stops can be provided within the shift cylinder or also outside on a part of the gear shifting units connected with the piston. The invention is described in detail with the aid of drawings. The drawings show.

DESCRIPTION OF THE PREFERRED EMBODIMENTS

Figure 1:
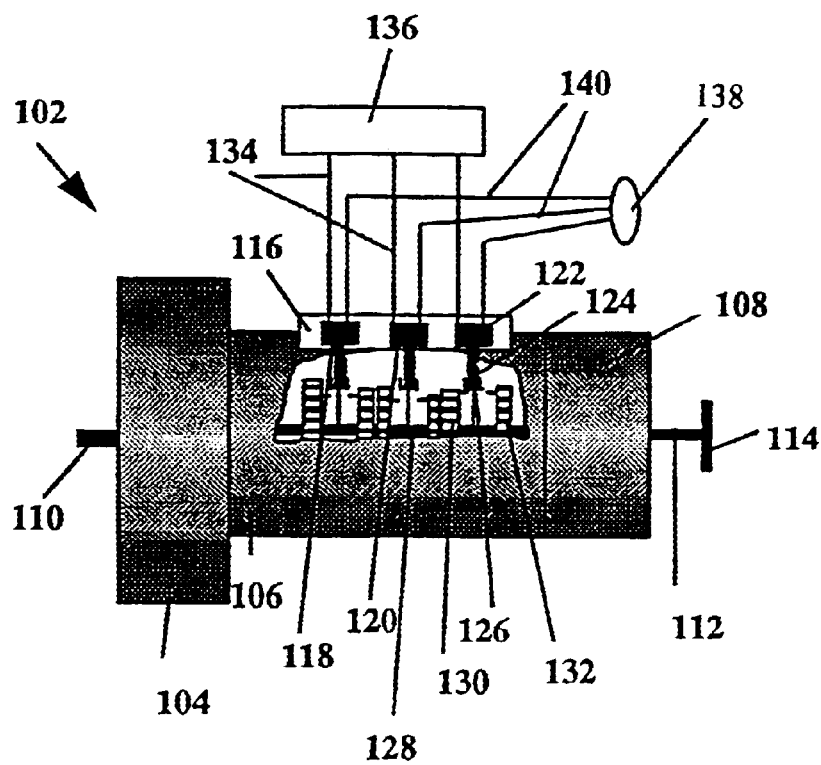
FIG. 1 is a transmission with gear shifting devices.

FIG. 1 diagrammatically shows a representation of a transmission 102 in a vehicle (not shown here). The transmission 102 has a clutch bell housing 104, a main gear 106 and an auxiliary gear 108, in addition to an input shaft 110 and an output shaft 112 with output flange 114. On the main gear 106 is provided one part 116. In the arrangement shown here, part 116 shows three separate gear shifting devices 118, 120 and 122. The gear shifting device 118, shown by way of example, engages with a shift fork 124 in a sliding sleeve 126 which is axially movable along a shaft 128 and non-rotatably connected with the shaft 128. By displacement of the sliding sleeve 126, it can be connected either with the gear wheel 130 or the gear wheel 132 to create a torque transmission. The gear shifting devices 118, 120 and 122 are connected with a control device 136, via electric lines 134, such as an electronic transmission computer or a vehicle master. The gear shifting devices 118, 120 and 122 are likewise connected via lines 140 with a pressure source 138 for a control fluid.

Figure 2:
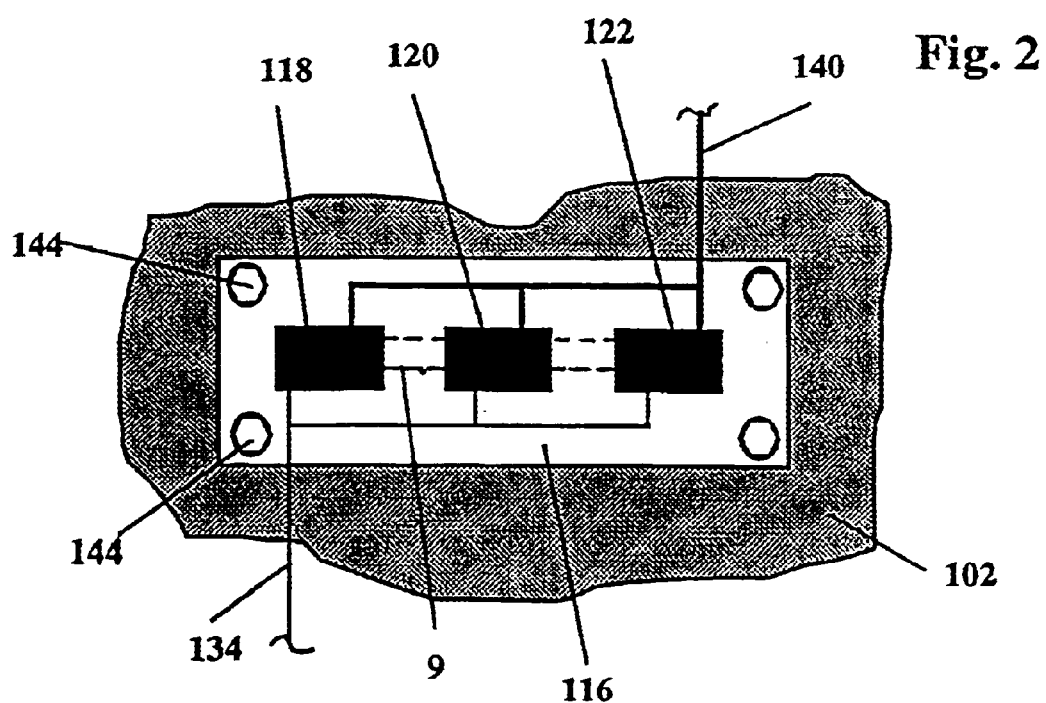
FIG. 2 is an arrangement of gear shifting devices in a row.

FIG. 2 shows a segment of the housing of transmission 102 where, in a part 116, are comprised the gear shifting devices 118, 120 and 122. The part 116 is fastened to the transmission 102 by means of connecting elements 144. To the gear shifting devices 118, 120 and 122, lead lines 140, for supply of the control fluid, and electric lines 134, for connection with the control device 136.

Figure 3:
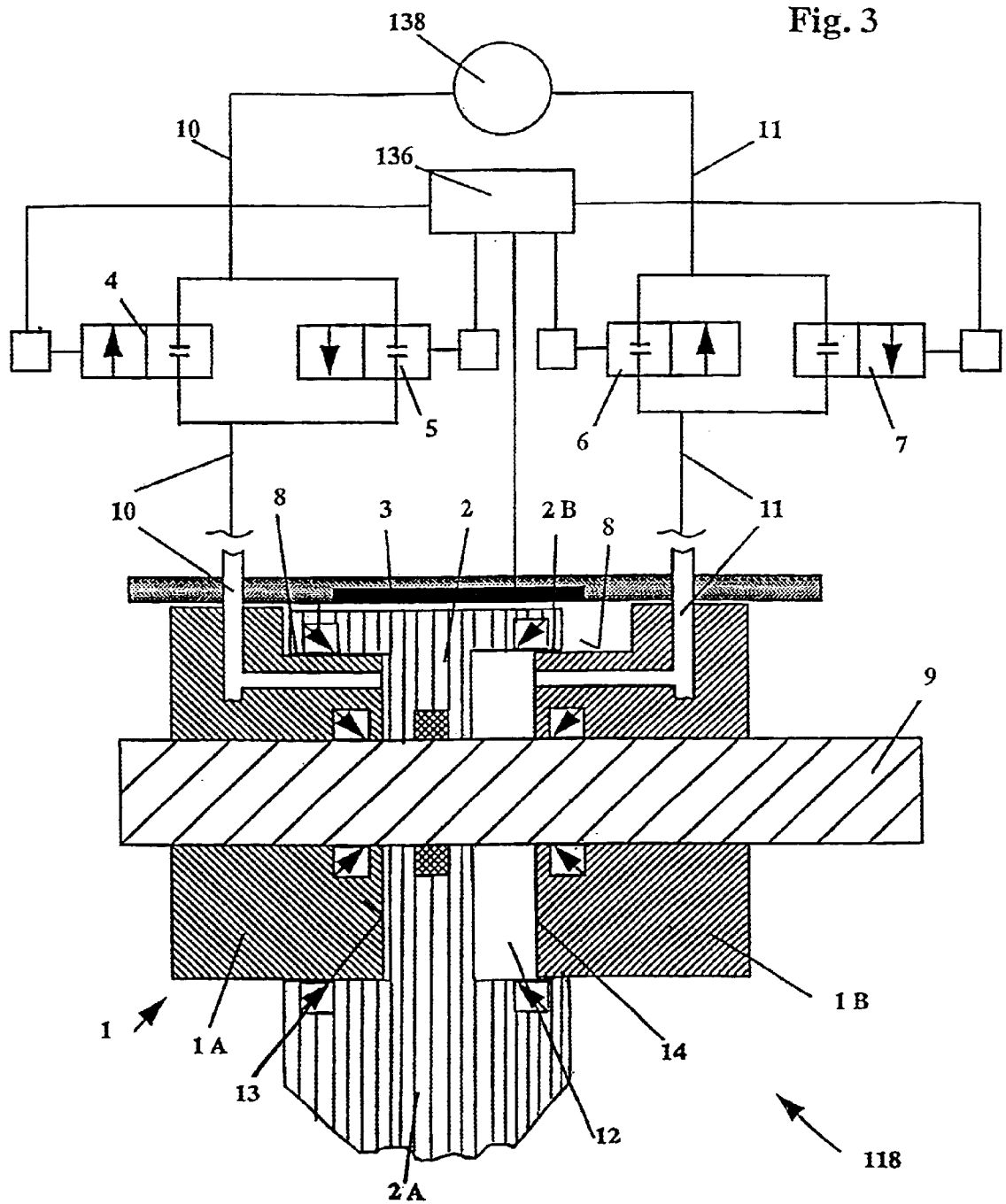
FIG. 3 is a representation of a gear shifting device.

FIG. 3 shows a fundamental representation of a gear shifting device 18 for an automatic transmission in vehicles with displacement measuring devices and pulse-sensitive directional valves in longitudinal section, which has one shift cylinder 1 formed by two parts 1A and 1B and one piston 2.

The moved weights can be considerably reduced by the configuration of shift cylinder 1 in two parts 1A and 1B.

In the embodiment shown, the piston 2, designed as a gear shifting element, moves between the fixed cylinder parts 1A and 1B.

The piston 2 is designed in one piece with a shift fork 2A whereby connecting elements between piston 2 and one other gear shifting element such as the shift fork 2A or a possible shift lever are not needed. The connection between piston 2 and shift fork 2A is thus sturdy and designed with the shortest path.

In another design (not shown), it is possible in the exact same manner that cylinder parts 1A and 1B be connected with shift fork 2A, the cylinder parts 1A and 1B carrying out the movement relative to piston 2.

As a result of the constructionally very advantageous design of shift cylinder 1, namely, in a divided design consisting of two parts 1A and 1B, the cylinder parts 1A and 1B can thus serve as gear shifting elements, whereby a variable configuration of the transmission is possible.

To detect the position of piston 2 in shift cylinder 1, or between cylinder parts 1A and 1B, according to FIG. 3, displacement measuring device 3 is attached parallel to the displacement axis of piston 2, such as inductive path sensors, which are connected with a control device 136, which, depending on the position of piston 2 detected by the inductive path sensors, relays electronic control signals to pulse-sensitive valves 4, 5, 6 and 7.

The piston 2 has a guide shoulder 2B by which it is led into a recess 8 formed in each one of the cylinder parts 1A and 1B. Both the cylinder parts 1A and 1B and piston 2 are situated around a rail 9 which extends axially through cylinder parts 1A and 1B and the piston 2 in the direction of movement of piston 2.

The arrangement of the cylinder parts 1A and 1B of shift cylinder 1 and of piston 2 on rail 9 has a main advantage that thereby a row of shift cylinders can be easily situated in a small space, especially the reduced number of parts and the easy assembly bringing decisive cost advantage. The control for all gear shifting devices of a transmission can in principle be attached to said rail 9.

Referring to FIG. 3, the cylinder parts 1A and 1B are installed firmly preassembled, but obviously they can also be fixed in an installed state depending on the tolerances of the vehicle.

To shift piston 2 in shift cylinder 1, a pneumatic or hydraulic pressure medium is fed from an external pressure source 138, via pressure lines 10 and 11. In each pressure line 10 and 11, two electromagnetic 2/2-way valves 4, 5 and 6, 7 are interposed, which control the through flow of the pressure medium through pressure lines 10 and 11 in such a manner the piston 2 moves at a speed corresponding to an optimal speed found empirically or via a simulation in this path position. The mode of valve control can be adapted specifically to the transmission depending on the weights to be shifted.

The pulse-sensitive valves 4, 5, 6 and 7 are designed for a continuous operation at 4 volts but here are operated with 24 volt pulses. Due to control of the pulse vales 4, 5, 6 and 7 with strong current pulses, they react very quickly. The pulse valves 4, 5, 6 and 7 are controlled, via the control device 136, depending on the position of piston 2 in shift cylinder 1, that has been detected by displacement measuring device 3. According to the position of the piston 2, different electric pulses are delivered to pulse valves 4, 5, 6 and 7, the pulse valves opening with a pre-defined high pulse frequency and closing with a pre-defined low pulse frequency. Thus in shift cylinder 1, the through flow of pressure medium is changed, which sets in motion piston 2 in shift cylinder 1, and therewith also changes the speed of piston 2 during the gear shifting operation. The control of pulse valves 4, 5, 6 and 7 is so designed that all pulse-sensitive valves can be controlled separately, against each other or with each other. Thereby different speeds result for the piston and thus also different dynamic forces.

To illustrate the mode of operation of the gear shifting device, a shifting cycle is described in principle.

If in a gear shifting operation, the pressure medium is supplied through line 10 to the gear shifting device, pulse valve 5, which has the function of a feed valve, opens, while pulse valve 4, designed as drain valve, closes. The pressure medium thus reaches, via line 10, through the cylinder part 1A, into the working chamber 12 of piston 2, and moves piston 2, from stop surface 13 on cylinder part 1A, in the direction of stop surface 14 in the cylinder part 1B, lying opposite the stop surface 13.

At the beginning of a transmission synchronization phase, shortly before its impact on stop surface 14, piston 2 remains in a locked position, the pressure medium load of piston 2 considerably increasing due to the further supply of pressure medium through line 10.

The portion of the piston working chamber 12 that lies in the direction of movement of piston 2, is relieved during the whole gear shifting operation via pressure line 11, and open valve 6, designed as a drain valve. At the same time, pulse valve 7, that serves to supply the pressure medium, is closed.

At the end of the synchronization process, piston 2 is unlocked whereby it sets moving again in the direction of its end position on stop surface 14, doing this at higher speed due to the high pressure medium load during the synchronization process. The existing position of piston 2 is detected by the displacement measuring device 3, which via electric pulses, controls pulse valves 6 and 7 in a manner such that pulse valve 6, serving as a vent, is closed, with the result that a so-called cushion of pressure medium drastically reduces the movement of piston 2 on the last short path portion to stop surface 14. The pressure supply, via pulse valve 5 to pressure line 10, has already been adjusted during or toward the end of the brief stoppage of piston 2, during the synchronization phase of the transmission, by closing feed valve 5. To bring piston 2 to its end position, despite the pressure-medium cushion between piston 2 and stop surface 14, pulse valve 6 is shifted to an open position, by the displacement measuring device 3, immediately before the impact of piston 2 on stop surface 14, so that the pressure medium located between piston 2 and stop surface 14 can escape via pressure line 11, and so piston 2 not spring back when its strikes on stop surface 14.

For reversing, the shift cycle is the same, in the inverse direction, pulse valves 5 and 6 are closed, the gear shifting device is loaded with pressure via pressure line 11 and open valve 7, and relieved via open pulse valve 4 and pressure line 10.

Reference numerals

| 1 | shift cylinder | 106 | main gear |
| 1A | cylinder part | 108 | auxiliary transmission |
| 1B | cylinder part | 110 | input shaft |
| 2 | piston | 112 | output shaft |
| 2A | shift fork | 114 | output flange |
| 2B | guide shoulder | 116 | gear shifting device |
| 3 | displacement measuring device | 118 | gear shifting device |
| 4 | pulse-sensitive valve | 120 | gear shifting device |
| 5 | pulse-sensitive valve | 122 | gear shifting device |
| 6 | pulse-sensitive valve | 124 | shift fork |
| 7 | pulse-sensitive valve | 126 | sliding sleeve |
| 8 | recess | 128 | shaft |
| 9 | guiding rail | 130 | gear wheel |

-continued

Reference numerals

| | | | | |
|---|---|---|---|---|
| 10 | pressure line | | 132 | gear wheel |
| 11 | pressure line | | 134 | line |
| 12 | working chamber of the piston | | 136 | control device |
| 13 | stop surface | | 138 | pressure source |
| 14 | stop surface | | 140 | line |
| 102 | transmission | | 144 | connecting element |
| 104 | clutch bell housing | | | |

What is claimed is:

1. A power-assisted gear shifting device (118) for a multi-speed step-change transmission (102) of a step-down design, the power-assisted gear shifting device (118) comprising:

a shift cylinder (1) accommodating a single movable piston (2);

a plurality of valves (4, 5, 6, 7) connected to the shift cylinder (1) for facilitating movement of the piston, via a pressurized fluid, within the shift cylinder (1);

a gear shifting element (2A), directly connected to the piston, for facilitating torque transmission by a gear of the transmission; and a single guiding rail (9) engaging with the shift cylinder (1) and extending axially through the shift cylinder and the single piston and supporting the piston such that the piston is bidirectionally axially movable along the guiding rail (9).

2. The gear shifting device (118) according to claim 1, wherein the transmission has a plurality of gear shifting devices (118, 120, 122), and each of the gear shifting devices (118, 120, 122) is coupled to an auxiliary unit.

3. The gear shifting device (118) according to claim 2, wherein the plurality of gear shifting devices are provided in a separate assembly (116) and the separate assembly (116) is connected to the transmission (102).

4. The gear shifting device (118) according to claim 3, wherein each separate gear shifting device is tested and adjusted, as necessary, prior to installing the gear shifting device (118) in the transmission (102).

5. The gear shifting device (118) according to claim 1, wherein each of the plurality of valves (4, 5, 6, 7) is a pulsed 2/2 way valve.

6. The gear shifting device (118) according to claim 5, wherein each of the plurality of valves (4, 5, 6, 7) is loaded with a voltage corresponding to a multiple greater than one of a standard voltage of the associated valve (4, 5, 6 or 7).

7. The gear shifting device (118) according to claim 1, wherein the gear shifting device (118) has stops (62) which dampen an impact of the piston (2) as the piston (2) moves from one end position to another end position within the shift cylinder (1).

8. The gear shifting device (118) according to claim 1 wherein each of a plurality of gear shifting devices (118, 120, 122) is connected to a control device (136) by electrical lines, and each of the plurality of valves (4, 5, 6, 7) is connected to a pressure source (138) by pressure lines.

9. The gear shifting device (118) according to claim 8, wherein a respective displacement measure device (3) measures displacement of each piston (2) relative to each associated shift cylinder (1) and each displacement measure device (3) is coupled to the control device (136).

10. The gear shifting device (118) according to claim 1, wherein seals are provided between the piston (2) and the shift cylinder (1) to facilitate relative movement therebetween and further seals are provided between the shift cylinder (1) and the guiding rail (9).

11. A power-assisted gear shifting device (118) for a multi-speed step-change transmission (102) of a step-down design, the power-assisted gear shifting device (118) comprising:

a shift cylinder (1) accommodating a movable piston (2);

a plurality of valves (4, 5, 6, 7) connected to the shift cylinder (1) for facilitating movement of the piston, via a pressurized fluid, within the shift cylinder (1);

a gear shifting element (2A), directly connected to the piston, for facilitating torque transmission by a gear of the transmission; and a guiding rail (9) engaging with the shift cylinder (1) and supporting the piston such that the piston is axially movable along the guiding rail (9);

wherein the transmission has a plurality of gear shifting devices (118, 120, 122), and each of the gear shifting devices (118, 120, 122) is coupled to an auxiliary unit; and the plurality of gear shifting devices (118, 120, 122) are disposed linearly in one row along side one another along the guiding rail (9).

12. A plurality of gear shifting devices (118, 120, 122) for a multi-speed step-change transmission (102) of a step-down design, each one of the power-assisted gear shifting devices (118, 120, 122) comprising:

in each gear shifting device, a shift cylinder (1) accommodating a single movable piston (2);

a plurality of valves (4, 5, 6, 7) connected to the shift cylinder (1) for facilitating movement of the piston, via a pressurized fluid, within the shift cylinder (1); and a gear shifting element (2A), directly connected to the piston, for facilitating torque transmission by a gear of the transmission;

wherein each gear shifting device of the plurality of gear shifting devices is disposed linearly in a single row of the gear shifting devices along a single guiding rail; and the single guiding rail (9) engages with each shift cylinder (1) of each gear shifting device and extends axially through the shift cylinder and the piston of each gear shifting device and supports each piston such that each piston is bidirectionally axially movable along the single guiding rail (9).

13. A plurality of gear shifting devices (118, 120, 122) for a multi-speed step-change transmission (102) of a step-down design, each one of the power-assisted gear shifting devices (118, 120, 122) comprising:

a shift cylinder (1) accommodating a movable piston;

a plurality of valves (4, 5, 6, 7) connected to the shift cylinder (1) for facilitating movement of the piston, via a pressurized fluid, within the shift cylinder (1);

a gear shifting element (2A), directly connected to the piston, for facilitating torque transmission by a gear of the transmission;

a guiding rail (9) engaging with the shift cylinder (1) and supporting the piston such that the piston is axially movable along the guiding rail (9); and each of the plurality of valves (4, 5, 6, 7) is a pulsed 2/2 way valve, and each of the plurality of valves (4, 5, 6, 7) is loaded with a higher frequency when engaging a torque-transmitting connection than when disengaging a torque-transmitting connection.

14. The gear shifting device (118) according to claim 13, wherein the transmission has a plurality of gear shifting devices (118, 120, 122) and the plurality of gear shifting devices (118, 120, 122) are disposed linearly in one row along side one another along the guiding rail (9).

15. The gear shifting device (118) according to claim 14, wherein each piston (2) of the plurality of gear shifting devices (118, 120, 122) is slidable upon the guiding rail (9).

16. The gear shifting device (118) according to claim 14, wherein the plurality of gear shifting devices are provided in a separate assembly (116), and the separate assembly (116) is connected with the transmission (102).

17. The gear shifting device (118) according to claim 14, wherein each separate gear shifting device is tested and adjusted, as necessary, prior to installing the gear shifting in the transmission (102).

* * * * *